(12) United States Patent
Fernquist et al.

(10) Patent No.: US 9,805,482 B2
(45) Date of Patent: Oct. 31, 2017

(54) COMPUTER-IMPLEMENTED TUTORIAL FOR VISUAL MANIPULATION SOFTWARE

(71) Applicant: AUTODESK, INC., San Rafael, CA (US)

(72) Inventors: Jennifer Fernquist, San Francisco, CA (US); Tovi Grossman, Toronto (CA); Mark Davis, Mill Valley, CA (US); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 47 days.

(21) Appl. No.: 13/651,315

(22) Filed: Oct. 12, 2012

(65) Prior Publication Data

US 2013/0100159 A1 Apr. 25, 2013

Related U.S. Application Data

(60) Provisional application No. 61/546,928, filed on Oct. 13, 2011.

(51) Int. Cl.
G06T 11/20 (2006.01)
(52) U.S. Cl.
CPC ............ *G06T 11/20* (2013.01); *G06T 11/203* (2013.01)
(58) Field of Classification Search
None
See application file for complete search history.

(56) References Cited

U.S. PATENT DOCUMENTS

| | | | | |
|---|---|---|---|---|
| 5,940,082 A * | 8/1999 | Brinegar et al. | | 345/442 |
| 8,402,391 B1 * | 3/2013 | Doray | | G06F 3/0482 |
| | | | | 715/834 |
| 2002/0049786 A1* | 4/2002 | Bibliowicz | | G06F 3/0481 |
| | | | | 715/211 |
| 2007/0176893 A1* | 8/2007 | Sato | | H04L 67/38 |
| | | | | 345/156 |
| 2009/0189905 A1* | 7/2009 | Cho | | G06F 17/214 |
| | | | | 345/467 |
| 2009/0193345 A1* | 7/2009 | Wensley | | H04L 65/4015 |
| | | | | 715/756 |
| 2010/0201689 A1* | 8/2010 | Wang | | G06K 9/469 |
| | | | | 345/442 |
| 2010/0302164 A1* | 12/2010 | Pienimaa et al. | | 345/168 |
| 2011/0018880 A1* | 1/2011 | Whited et al. | | 345/473 |
| 2011/0208807 A1* | 8/2011 | Shaffer | | G06F 3/0418 |
| | | | | 709/203 |

* cited by examiner

*Primary Examiner* — Barry Drennan
*Assistant Examiner* — Jason Pringle-Parker
(74) *Attorney, Agent, or Firm* — Artegis Law Group, LLP (57) ABSTRACT

A method for reproducing authored content within a visual manipulation software environment includes displaying the authored content, such as an individual drawing stroke, in a manner that enables the end-user to experience the temporal dynamics associated with the creation of each drawing stroke or action performed by the author when creating the content. Each individual drawing stroke created by the author may be displayed in a tutorial with the same speed and direction used by the author to create the stroke, and can then be used as a guidance curve by the end-user. End-user input corresponding to the displayed author content is then received and used to generate an end-user version of the displayed content.

36 Claims, 4 Drawing Sheets

COMPUTER-IMPLEMENTED TUTORIAL FOR VISUAL MANIPULATION SOFTWARE

CROSS-REFERENCE TO RELATED APPLICATION(S)

The present application claims priority to U.S. Provisional Patent Application No. 61/546,928, filed Oct. 13, 2011, the entire contents of which are hereby incorporated herein by reference.

BACKGROUND OF THE INVENTION

Field of the Invention

The present invention relates generally to the field of computer graphics software and, more specifically, to a computer-implemented tutorial for visual manipulation software.

Description of the Related Art

More complex software applications can be difficult and intimidating for new users to learn. As a result, the utility of such applications can be limited, despite having many powerful features, since users may not readily learn how to use the application interface to access these features or to use optimal workflows to complete specific tasks. In addition, the utility of image manipulation software, such as sketching programs, can be further limited when a new user of the program is not already skilled as a visual artist.

Application tutorials are commonly used to guide less-experienced users through tasks in a software application in order to teach users specific skills and provide users experience with the application in an engaging fashion. However, if the challenges presented within these tutorials are not appropriately matched to a specific user's skill level, the user may not be fully engaged. Lack of engagement can be caused boredom, such as when tasks set forth in the tutorial are too easy, or by being overwhelmed with too much information and/or tasks that are too difficult to complete. This can be especially problematic when the successful completion of a tutorial requires some previously acquired skill or knowledge, for example the ability to draw or sketch. Without this previously acquired skill, a novice user can have difficulty getting a feel for holistic, high-level processes in the software application because of difficulties experienced with individual steps or because one or more steps in the tutorial process require an inordinate amount of time to complete.

As the foregoing illustrates, there is a need in the art for a improved way to teach users to use visual manipulation software.

SUMMARY OF THE INVENTION

One embodiment of the present invention sets forth a method for reproducing authored content within a visual manipulation software environment, such as sketching and computer-aided design programs. The method includes displaying content created by the author of the tutorial, such as an individual drawing stroke, in a manner that enables the end-user to experience the temporal dynamics associated with the creation of each drawing stroke or action performed by the author when creating the content. Specifically, each individual drawing stroke created by the author may be displayed in the tutorial with the same speed and direction used by the author to create the stroke, and can then be used as a guidance curve by the end-user. End-user input corresponding to the displayed author content is then received and used to generate an end-user version of the displayed content.

One advantage of the disclosed method is that, unlike a tracing exercise, each stroke or action in the process of generating digital image content is displayed sequentially and in a fashion that illustrates how the particular stroke or action was carried out by the author. In this way, the end-user can experience the temporal dynamics of the first user creating a particular stroke. In addition, end-user drawing strokes can be compared to corresponding author-created content for the generation of quantitative feedback to the end-user.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
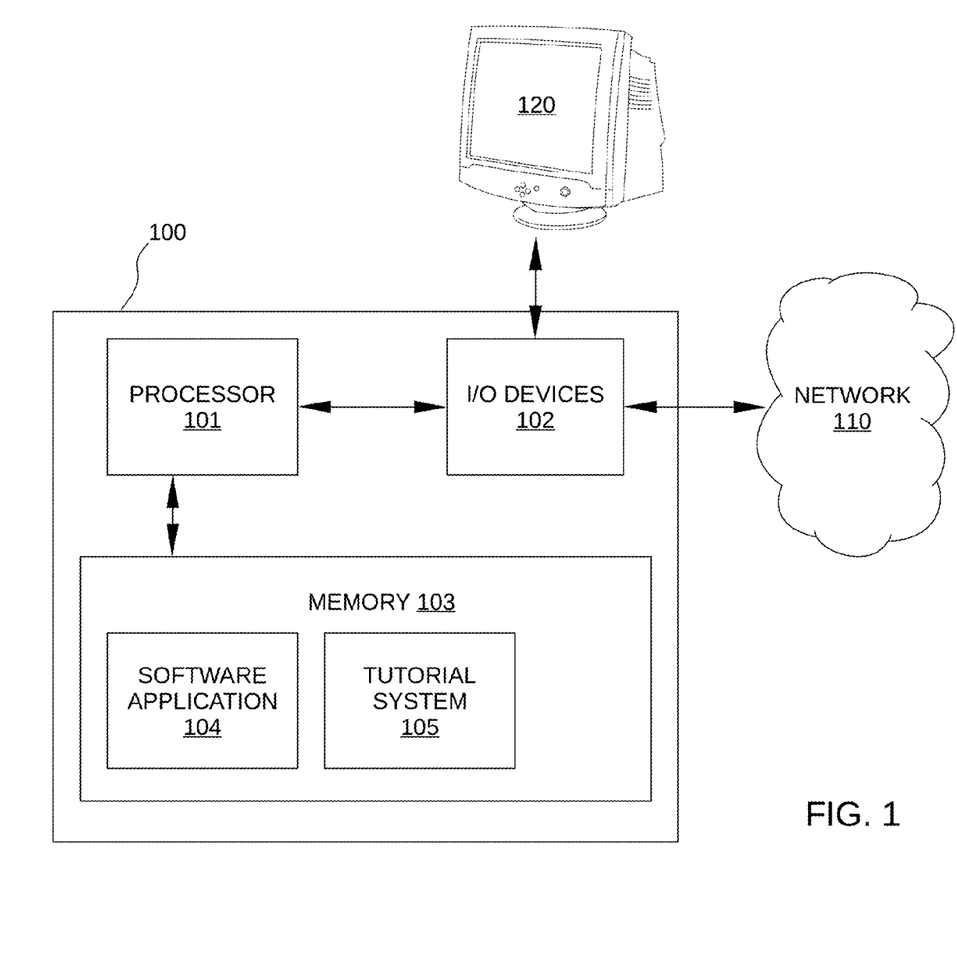
FIG. 1 is a block diagram of a computing device configured to implement one or more embodiments of the present invention.

FIG. 1 is a block diagram of a computing device 100 configured to implement one or more embodiments of the present invention. Computing device 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing device 100 includes a processor 101, input/output (I/O) devices 102, and a memory block 103, and is configured to run a visual manipulation application 104 that resides in memory block 103. Computing device 100 is configured to receive input from an end user via I/O devices 102 and is further configured to display graphical images and/or video to the end user via I/O devices 102. It is noted that the computing device described herein is illustrative and that any other technically feasible configurations fall within the scope of the invention.

Processor 101 may be any suitable processor implemented as a central processing unit (CPU), a graphics processing unit (GPU), an application-specific integrated circuit (ASIC), a field programmable gate array (FPGA), or another type of processing unit. Processor 101 is configured to execute program instructions associated with a particular instruction set architecture (ISA) specific to processor 101, including visual manipulation application 104 and a tutorial system 105. Processor 101 is also configured to receive data from and transmit data to I/O devices 102 and memory 103.

I/O devices 102 include devices that may be used to input data to computing device 100 or devices that output data from computing device 100. I/O devices 102 may include input devices, such as a joystick, a switch, a microphone, a video camera, a keyboard, a mouse, a touchpad, an interactive pen display, and/or a pen tablet, among others. I/O devices 102 may also include one or more output devices, such as a display screen, a speaker, a projector, or a lamp, among others. In addition, I/O devices 102 may include devices used to input data to or output data from computing device 100, such as an Ethernet port, a serial port, a compact disc (CD) drive, or a digital video disc (DVD) drive, among others. In some embodiments, one or more of I/O devices 102 are configured to couple computing device 100 to a network 110.

I/O devices 102 also include a display device 120. Display device 120 may be a computer monitor, a video display screen, a display apparatus incorporated into a hand held device, or any other technically feasible display screen configured to present video media to an end user. In some embodiments, display device 120 is a terminal window displayed on another display device, such as a video display window that has been opened by visual manipulation application 104.

Network 110 may be any technically feasible type of communications network that allows data to be exchanged between computing device 100 and external entities or devices, such as a video archive database or a website or server that provides access to tutorials associated with visual manipulation application 104. For example, network 110 may include a wide area network (WAN), a local area network (LAN), a wireless (WiFi) network, and/or the Internet, among others.

Memory block 103 may be a hard disk, a flash memory stick, a compact disc read-only memory (CD-ROM), a random access memory (RAM) module, or any other type of volatile or non-volatile memory unit capable of storing data. Memory 103 includes various software programs that can be executed by processor 101, including visual manipulation application 104 and, in some embodiments, tutorial system 105, as described in greater detail below. In other embodiments, tutorial system 105 resides on a server, and may be downloaded to computing device 100 via network 110. In yet other embodiments, tutorial system 105 may reside on a remote server rather than being run locally by computing device 100, and output from tutorial system 105 is displayed locally with display device 120.

Visual manipulation application 104 may be any visual manipulation software, such as a sketching or drawing program or a computer-aided design program, and comprises program instructions that can be executed by processor 101. In some embodiments, visual manipulation application 104 may facilitate creation of sketches and drawings using digital tools that mimic traditional media. For example, visual manipulation application 104 may be configured to provide a digital interface to an end-user for image editing, sketch drawing, performing geometric design, creating three-dimensional sketches from a two dimensional perspective viewpoint, generating machine drawings and/or solid models, etc. In some embodiments, visual manipulation application 104 may also include one or more tutorial systems 105 for teaching an end-user one or more features of visual manipulation application 104. Alternatively, one or more tutorial systems 105 may be downloaded from a remote location via network 110 and run by computing device 110 either in a stand-alone more or in conjunction with visual manipulation application 104.

Tutorial system 105 is a software application configured to provide an end-user of visual manipulation application 104 the experience of successfully drawing previously created content. The previously created content may be created by an expert artist or any other author skilled in the use of visual manipulation application 104. By showcasing the content of an experienced user of visual manipulation application 104 and the associated workflows used to create said content, tutorial system 105 provides a particularly engaging learning environment for a less-experienced end-user of visual manipulation application 104. Tutorial system 105 is configured to provide an engaging learning environment even when the less-experienced end-user lacks the domain artistic skills that are necessary to successfully produce content with visual manipulation application 104, such as sketching.

In operation, embodiments of tutorial system 105 use a captured workflow presented in a step-by-step format to an end-user. Each step of the workflow includes image-based tutorial instruction and, in some embodiments, accompanying static text associated with the image-based tutorial instruction. In some embodiments, the captured workflow can include the workflow of an experienced user of visual manipulation application 104 that is captured in an automated fashion. In addition, in some embodiments, individual drawing strokes performed by the author during each step of a particular tutorial are presented sequentially and in a manner that enables the end-user to experience the temporal dynamics associated with the creation of each drawing stroke or action performed by the author when creating the content. Furthermore, in steps requiring sketching, each author-created drawing stroke may be used as a guidance curve for the less-experienced end-user, as a baseline from which to generate quantified performance feedback for the less-experienced end-user, and as input for a stroke correction algorithm that can modify content created by the less-experienced end-user. Thus, tutorial system 105 is a content-centric tutorial system that more fully engages and challenges the end-user by enabling an end-user to produce his or her own content over the course of a tutorial session.

Figure 2:
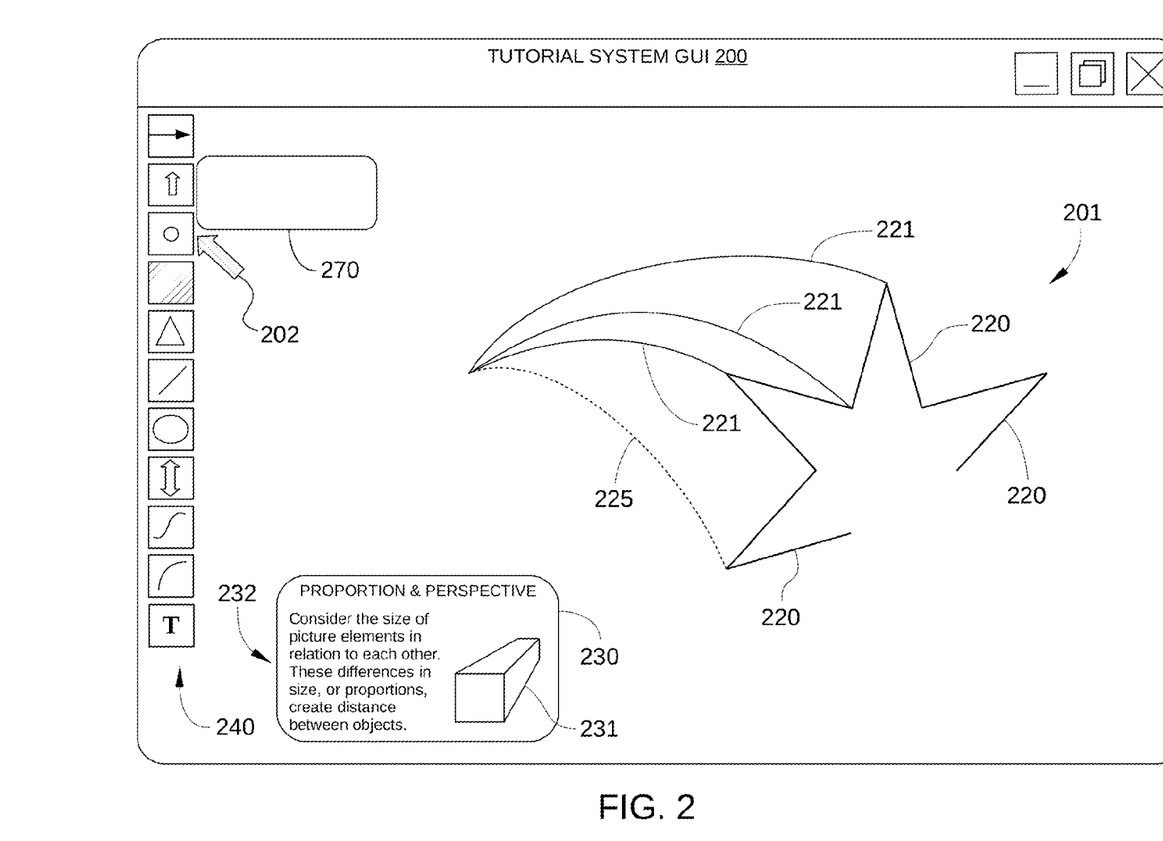
FIG. 2 is a conceptual illustration of a graphical user interface for a tutorial system displayed on a display device, according to one embodiment of the present invention.

FIG. 2 is a conceptual illustration of a graphical user interface (GUI) 200 for tutorial system 105 displayed on display device 120, according to one embodiment of the present invention. Display device 120 is configured as a terminal window displayed on a portion of a display screen and displays partially completed drawing 201, which includes multiple end-user drawing strokes, including straight lines 221 and curved lines 222. Also displayed on display device 120 are a cursor 202, a foundational concept overlay 230, tool buttons 240, and a preview stroke 225.

As shown, one or more steps have been completed in the process of an end-user creating drawing 201 as the end-user performs a particular tutorial using tutorial system 105. For example, in a first step, tutorial system 105 guides the end-user through the process of sequentially drawing straight lines 221 and in a second step, tutorial system 105 guides the end-user through the process of sequentially drawing curved lines 222. In later steps, shading, coloring, and other processes may be performed to instruct the end-user in how to utilize various features of visual manipulation application 104 to create drawing 201. Furthermore, the end-user also successfully creates artistic content upon completion of the tutorial using tutorial system 105.

In each step of the tutorial process, tutorial system 105 displays a preview stroke for the next drawing stroke or action to be completed in the sequence of drawing strokes and actions making up the step. In FIG. 2, preview stroke 225 is displayed, indicating the next drawing stroke that was performed in the sequence by the tutorial author and which should now be completed by the end-user. It is noted that preview stroke 225 is not simply a static display of the next drawing stroke to be completed by the end-user. Instead, preview stroke 225 in FIG. 2 acts as a stroke guidance curve that provides a real-time, animated presentation of the actions of the tutorial author. Specifically, preview stroke 225 is displayed with substantially the same rate or rates at which the tutorial author created the drawing stroke corresponding to preview stroke 225. Consequently, preview stroke 225 enables the end-user to experience the temporal dynamics associated with the creation of each drawing stroke or action performed by the author when creating drawing 201.

In some embodiments, preview stroke 225 is compared to corresponding end-user created content to generate quantitative feedback to the end-user of tutorial system 105. Thus, an end-user can receive immediate feedback after completing each drawing stroke. In some embodiments, such feedback can include a percentage score or other quantified score indicating how closely a drawing stroke completed by an end-user matches the corresponding drawing stroke (represented by preview stroke 225) created by the author of the tutorial. In some embodiments, positional feedback is provided, in which average distances are calculated between corresponding points of the author and end-user strokes. In some embodiments, temporal (timing) feedback is provided, which can be presented as a ratio of stroke times of the author-created stroke and the end-user created stroke.

In some embodiments, preview stroke 225 can be used as part of a stroke beautification or stroke correction algorithm included in tutorial system 105. In such embodiments, drawing strokes created by the end-user are combined with the corresponding author-created drawing stroke, so that, upon completion of the tutorial, end-user content more closely resembles author content. Because the content created by using tutorial system 105 is closer to author quality, the end-user is more likely to be engaged in the tutorial process and continue to use such tutorials. For example, in some embodiments, an end-user created drawing stroke is modified by interpolating between the end-user created stroke and the corresponding author-created stroke. In such embodiments, the level of stroke correction can be adjustable. Thus, when stroke guidance in tutorial system 105 is set to 100%, the user-created stroke will snap to the corresponding author stroke. Conversely, when stroke guidance is set to 0%, the user-created stroke will remain unchanged. With stroke guidance set to 50%, the drawing stroke that results from end-user input will be an average between the author-created drawing stroke and the end-user created drawing stroke.

In one embodiment, the stroke correction algorithm bases interpolation on the series of points making up the author-created stroke and the end-user created stroke. In such an embodiment, the stroke correction algorithm first analyzes the points of the author-created stroke, recording the distances between consecutive points relative to the entire length of the stroke. The stroke correction algorithm then re-samples the user-created stroke to obtain the same number of vertices as the author-created stroke, with the same relative distance between consecutive vertices. Lastly, the modified drawing stroke is generated, being defined as the linear interpolation between each pair of corresponding points of author-created and end-user created drawing strokes. An example of such an embodiment is illustrated in FIG. 3.

Figure 3:
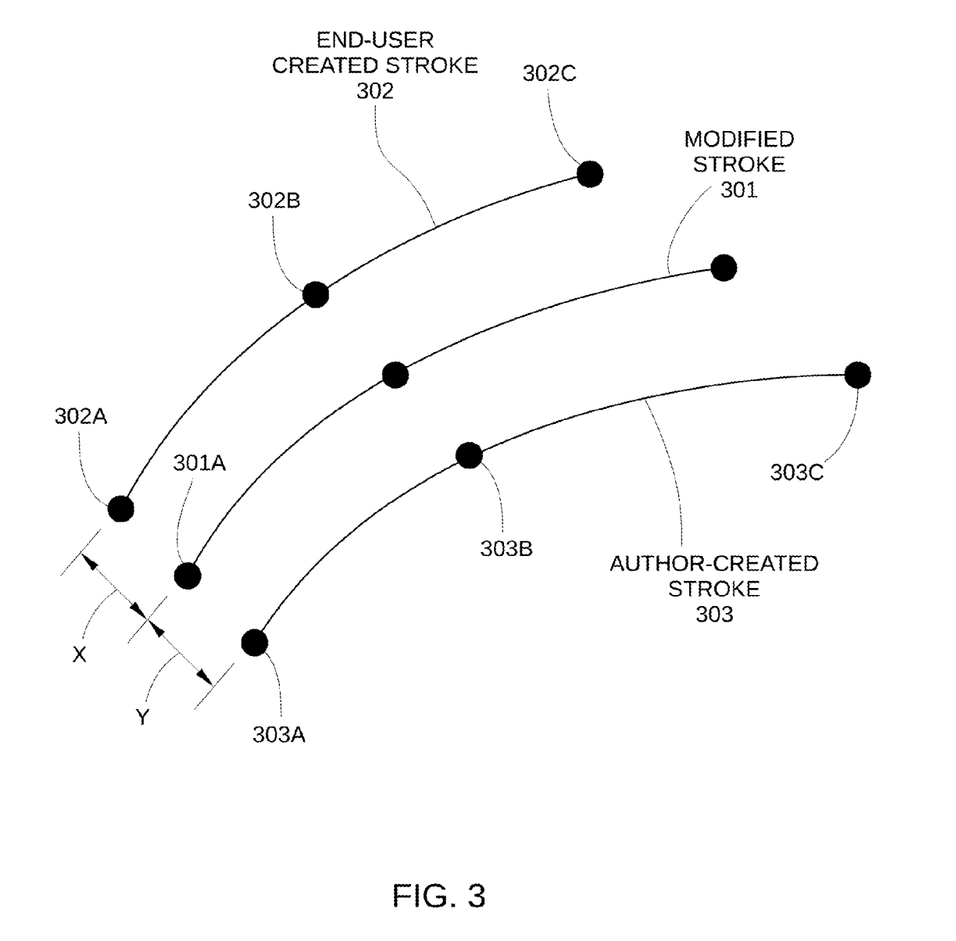
FIG. 3 illustrates a modified drawing stroke determined according to one embodiment of the invention.

FIG. 3 illustrates a modified drawing stroke determined according to one embodiment of the invention. As shown, a modified stroke 301 is defined by interpolating between corresponding points 302A-302C along an end-user created stroke 302 and corresponding points 303A-303C along an author-created stroke 303. In the embodiment illustrated in FIG. 3, stroke guidance is defined as 50%. Consequently, a distance X between corresponding point 302A and point 301A is equal to a distance Y between corresponding point 303A and point 301A.

In some embodiments, a fundamental content creation concept related to the current step or drawing stroke in the tutorial process is communicated to the end-user via foundational concept overlay 230. Such fundamental concepts may include basic drawing concepts, such as lighting, 1-, 2-, or 3-point perspective, the use of construction lines, and the like. In some embodiments, foundational concept overlay 230 includes text 231 briefly describing the concept, an image 231 illustrating the concept, or both.

In some embodiments, positional call-outs may be included as a part of GUI 200. In such embodiments, a positional call-out 270 may be displayed adjacent to cursor 202 to provide instructions in graphical images to the end-user that show how to use a specific menu, button, or tool to accomplish a task. For example, if a particular positional call-out 270 provides instructions for a specific tool button 240, positional call-out 270 is overlayed proximate that button tool button 240. Once the step is successfully completed, tutorial system 105 automatically advances to the next step, and the associated instruction is provided.

In some embodiments, the current step being performed by an end-user during a tutorial can be "auto-completed," i.e., author-created content is used for the remaining drawing strokes and/or actions in the tutorial step that have not been completed by the end-user. In this way, repetitive or well-understood actions can be skipped by the end-user. Thus, a hybrid version of drawing 201 is completed by the end-user at the end of the tutorial, in which end-user created content and author-created content are combined. Generally, a suitable input from the end-user causes tutorial system 105 to auto-complete the current step.

In some embodiments, a user can advance to the next step in a tutorial before completing the current step. For example, if the current step instruction is to change the pen color to blue, a user may instead choose to switch the pen color to red. A suitable input from the end user causes the tutorial to skip to the next step, even though the current step was never completed successfully. In this way, a user can customize the final appearance of the content created during the tutorial.

In some embodiments, tutorial system 105 is configured with a mechanism for toggling between the current end-user view and a view of an author-created portion of the tutorial content. For example, in one embodiment, a user can toggle between the current version of drawing 201 and the author-created version of drawing 201 after the current step is completed. Alternatively, the author-created version of drawing 201 showing the current step completed may be overlayed on the current end-user created version of drawing 201 and viewed simultaneously with the end-user created version of drawing 201. In another embodiment, the author-created version of the entire drawing 201 can be toggled to or overlayed on the current end-user version of drawing 201. Alternatively, the author-created version of drawing 201 after any particular step in the tutorial process can be toggled to or overlayed on the current end-user version of drawing 201. In this way, the end-user can be sure that he or she understands what the final objective of the tutorial or tutorial step is and will have a more informed understanding of the different steps of the tutorial process.

In some embodiments, tutorial system 105 can provide an optimal experience to the end-user by adapting the tutorial process based on either end-user input, such as a maximum time threshold to complete a particular tutorial, or measured performance of the end-user during the course of the tutorial currently underway.

In some embodiments, an end-user inputs a maximum time available for completion of a tutorial using tutorial system 105. In such embodiments, tutorial system 105 determines what portion of each tutorial steps is performed by the end-user, and uses an auto-complete function to create the remaining drawing strokes and perform any remaining actions in the current step of the tutorial. In some such embodiments, tutorial system 105 shortens each step proportionally, and in other embodiments, tutorial system 105 disproportionately shortens steps in a tutorial that include more redundant actions and/or drawing strokes. Thus, tutorial system 105 can tailor a pre-existing tutorial to the time available to a specific user, thereby enhancing the tutorial experience for the end-user.

In some embodiments, tutorial system 105 modifies a tutorial based on the measured performance of the end-user during the course of the tutorial. For example, when the end-user creates drawing strokes that exceed a predetermined threshold of a quantified end-user performance score, tutorial system 105 may use an auto-complete function to complete the current step. Alternatively, tutorial system 105 may complete any remaining instances of the specific action or drawing stroke that the end-user has demonstrated proficiency in, either in the current step, or in all future steps of the tutorial.

Figure 4:
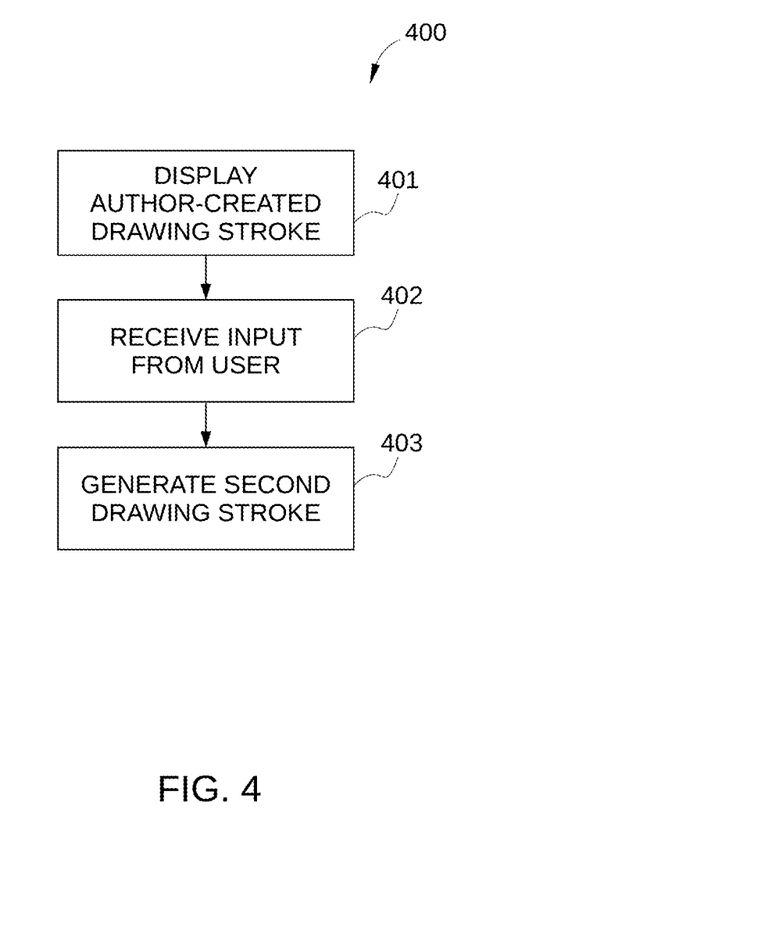
FIG. 4 is a flowchart of method steps for reproducing authored content within a visual manipulation software environment, according to one embodiment of the present invention.

FIG. 4 is a flowchart of method steps for reproducing authored content within a visual manipulation software environment, according to one embodiment of the present invention. Although the method steps are described in conjunction with the system of FIGS. 1 and 2, persons skilled in the art will understand that any system configured to perform the method steps, in any order, is within the scope of the invention.

As shown, the method 400 begins at step 401, where computing device 100 causes a drawing stroke to be displayed that is associated with a digital drawing that was previously created by a first user, such as a tutorial author. The drawing stroke is displayed at one or more rates that are substantially the same as one or more corresponding rates at which the first user created the first stroke, so that the end-user experiences the temporal dynamics of the first user creating the first drawing stroke.

In step 402, computing device 100 receives input from an end-user that is associated with the first stroke. Specifically, when the end-user inputs a drawing stroke intended to correspond to the first drawing stroke using a digital tablet, computer screen, or the like, the input is digitized and then transmitted to computing device 100.

In step 403, computing device 100 generates a second drawing stroke associated with an end-user version of the digital drawing that was previously created by the tutorial author. In some embodiments, computing device 100 can then display the second drawing stroke and the end-user version of the digital drawing to the end-user.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for reproducing authored content in a visual manipulation software environment, the method comprising:

causing a first stroke associated with a digital drawing that was previously created by a first user to be displayed to a second user at a first plurality of rates, wherein the first plurality of rates at which the first stroke is displayed correspond to a second plurality of rates at which the first stroke was created;

receiving from the second user input that is associated with the first stroke;

generating a second stroke associated with another version of the digital drawing for display based on the input received from the second user;

comparing the first stroke to the second stroke to generate a ratio that reflects a degree of similarity between the first stroke and the second stroke, wherein the ratio is based on a first stroke time associated with the first stroke and a second stroke time associated with the second stroke; and interpolating between the first stroke and the second stroke, based on the ratio, to generate a modified second stroke.

2. The method of claim 1, further comprising, after generating the second stroke, displaying another stroke associated with the digital drawing that was previously created by the first user, wherein the another stroke is displayed with respect to the first stroke in an order that reflects a workflow implemented by the first user to create the digital drawing.

3. The method of claim 1, wherein causing the first stroke to be displayed comprises causing the first stroke to be displayed in the same direction in which the first user created the stroke.

4. The method of claim 1, wherein the visual manipulation software environment comprises at least one of a digital drawing program, an image editing program, a three-dimensional modeling program, and a computer-aided design program.

5. The method of claim 1, further comprising causing information associated with the creation of the first stroke to be displayed concurrently with the first stroke being displayed, the information identifying a content creation concept related to the first stroke.

6. The method of claim 1, further comprising, in response to an input from the second user, causing at least a portion of the digital drawing to be displayed concurrently with second user content associated with the another version of the digital drawing.

7. The method of claim 1, further comprising, after generating the second stroke, determining and then causing to be displayed at least one of a positional comparison and a temporal comparison of the first stroke with the second stroke.

8. The method of claim 1, further comprising, in response to an input from the second user, generating a hybrid digital drawing by combining the second stroke with a portion of the digital drawing that was previously created by the first user.

9. The method of claim 8, wherein the input from the second user comprises a time threshold for completing the another version of the digital drawing, and further comprising determining the portion of the digital drawing used to generate the hybrid digital drawing based on the time threshold.

10. The computer-implemented method of claim 1, wherein the first stroke was previously created by the first user.

11. The computer-implemented method of claim 1, wherein the first plurality of rates at which the first stroke is displayed are the same as the second plurality of rates at which the first stroke was created.

12. The computer-implemented method of claim 1, wherein the ratio comprises a ratio between stroke times associated with the first stroke and the second stroke.

13. The computer-implemented method of claim 1, wherein interpolating between the first stroke and the second stroke occurs based further on an adjustable level of stroke correction.

14. The method of claim 1, wherein:
comparing the first stroke to the second stroke comprises:
recording the distances between consecutive vertices relative to the entire length of the first stroke; and
resampling the second stroke to obtain the same number of vertices and the same relative distance between consecutive vertices as the first stroke, and
interpolating between the first stroke and the second stroke comprises performing one or more linear interpolation operations between each pair of corresponding vertices of the first stroke and second stroke.

15. A non-transitory computer-readable medium including instructions that, when executed by a processing unit, cause the processing unit to provide instructional information to an end-user of a software application, by performing the steps of:
causing a first stroke associated with a digital drawing that was previously created by a first user to be displayed to a second user at a first plurality of rates, wherein the first plurality of rates at which the first stroke is displayed correspond to a second plurality of rates at which the first stroke was created;
receiving from the second user first input that is associated with the first stroke;
generating a second stroke associated with another version of the digital drawing for display based on the first input received from the second user;
comparing the first stroke to the second stroke to generate a first ratio that reflects a degree of similarity between the first stroke and the second stroke, wherein the first ratio is based on a first stroke time associated with the first stroke and a second stroke time associated with the second stroke; and
selecting a third stroke associated with the digital drawing to be displayed to the second user based on the first ratio.

16. The non-transitory computer-readable medium of claim 15, further comprising, after generating the second stroke, displaying another stroke associated with the digital drawing that was previously created by the first user, wherein the another stroke is displayed with respect to the first stroke in an order that reflects a workflow implemented by the first user to create the digital drawing.

17. The non-transitory computer-readable medium of claim 15, wherein causing the first stroke to be displayed comprises causing the first stroke to be displayed in the same direction in which the first user created the stroke.

18. The non-transitory computer-readable medium of claim 15, further comprising interpolating between the first stroke and the second stroke to generate a modified second stroke.

19. The non-transitory computer-readable medium of claim 15, wherein the visual manipulation software environment comprises at least one of a digital drawing program, an image editing program, a three-dimensional modeling program, and a computer-aided design program.

20. The non-transitory computer-readable medium of claim 15, further comprising causing information associated with the creation of the first stroke to be displayed concurrently with the first stroke being displayed, the information identifying a content creation concept related to the first stroke.

21. The non-transitory computer-readable medium of claim 15, further comprising, in response to an input from the second user, causing at least a portion of the digital drawing to be displayed concurrently with second user content associated with the another version of the digital drawing.

22. The non-transitory computer-readable medium of claim 15, further comprising, after generating the second stroke, determining and then causing to be displayed at least one of a positional comparison and a temporal comparison of the first stroke with the second stroke.

23. The non-transitory computer-readable medium of claim 15, further comprising, in response to an input from the second user, generating a hybrid digital drawing by combining the second stroke with a portion of the digital drawing that was previously created by the first user.

24. The non-transitory computer-readable medium of claim 23, wherein the input from the second user comprises a time threshold for completing the another version of the digital drawing, and further comprising determining the portion of the digital drawing used to generate the hybrid digital drawing based on the time threshold.

25. The non-transitory computer-readable medium of claim 15, wherein the first stroke was previously created by the first user.

26. The non-transitory computer-readable medium of claim 15, wherein the first plurality of rates at which the first stroke is displayed are the same as the second plurality of rates at which the first stroke was created.

27. The non-transitory computer-readable medium of claim 15, further comprising the steps of:
determining that the first ratio exceeds a threshold value; and
in response, determining that a current step of a tutorial is complete.

28. The non-transitory computer-readable medium of claim 15, further comprising the steps of:
   determining that the first ratio exceeds a threshold value; and
   in response, identifying another instance of the first stroke and generating another instance of the second stroke on behalf of the second user.

29. The non-transitory computer-readable medium of claim 15, further comprising comparing the first stroke to the second stroke to generate positional feedback that includes one or more distances between at least one point on the first stroke and at least one point on the second stroke.

30. A system for reproducing authored content in a visual manipulation software environment, comprising:
   a display device; and
   a computing device coupled to the display device and including:
      a memory storing a software application, and
      a processor that, upon execution of the software application, performs the steps of:
         causing a first stroke associated with a digital drawing that was previously created by a first user to be displayed, via the display device, to a second user at a first plurality of rates, wherein the first plurality of rates at which the first stroke is displayed correspond to a second plurality of rates at which the first stroke was created,
         receiving from the second user input that is associated with the first stroke,
         generating a second stroke associated with another version of the digital drawing for display based on the input received from the second user,
         comparing the first stroke to the second stroke to generate a ratio that reflects a degree of similarity between the first stroke and the second stroke,
         comparing the first stroke to the second stroke to generate a ratio that reflects a degree of similarity between the first stroke and the second stroke, wherein the ratio is based on a first stroke time associated with the first stroke and a second stroke time associated with the second stroke,
         interpolating between the first stroke and the second stroke, based on the ratio, to generate a modified second stroke,
         determining that the ratio exceeds a threshold value, and
         in response, determining that a current step in a tutorial is complete.

31. A computer-implemented method for reproducing authored content in a visual manipulation software environment, the method comprising:
   causing a first stroke associated with a digital drawing that was previously created by a first user to be displayed to a second user at a first plurality of rates, wherein the first plurality of rates at which the first stroke is displayed correspond to a second plurality of rates at which the first stroke was created;
   receiving from the second user input that is associated with the first stroke;
   generating a second stroke associated with another version of the digital drawing for display based on the input received from the second user;
   comparing the first stroke to the second stroke to generate a ratio that reflects a degree of similarity between the first stroke and the second stroke;
   interpolating between the first stroke and the second stroke, based on the ratio, to generate a modified second stroke;
   in response to a further input from the second user, generating a hybrid digital drawing by combining the second stroke with a portion of the digital drawing that was previously created by the first user, wherein the further input from the second user comprises a time threshold for completing the another version of the digital drawing; and
   determining the portion of the digital drawing used to generate the hybrid digital drawing based on the time threshold.

32. A non-transitory computer-readable medium including instructions that, when executed by a processing unit, cause the processing unit to reproduce authored content in a visual manipulation software environment, by performing the steps of:
   causing a first stroke associated with a digital drawing that was previously created by a first user to be displayed to a second user at a first plurality of rates, wherein the first plurality of rates at which the first stroke is displayed correspond to a second plurality of rates at which the first stroke was created;
   receiving from the second user input that is associated with the first stroke;
   generating a second stroke associated with another version of the digital drawing for display based on the input received from the second user;
   comparing the first stroke to the second stroke to generate a ratio that reflects a degree of similarity between the first stroke and the second stroke;
   interpolating between the first stroke and the second stroke, based on the ratio, to generate a modified second stroke;
   in response to a further input from the second user, generating a hybrid digital drawing by combining the second stroke with a portion of the digital drawing that was previously created by the first user, wherein the further input from the second user comprises a time threshold for completing the another version of the digital drawing; and
   determining the portion of the digital drawing used to generate the hybrid digital drawing based on the time threshold.

33. A system for reproducing authored content in a visual manipulation software environment, comprising:
   a display device; and
   a computing device coupled to the display device and including:
      a memory storing a software application, and
      a processor that, upon execution of the software application, performs the steps of:
         causing a first stroke associated with a digital drawing that was previously created by a first user to be displayed to a second user at a first plurality of rates, wherein the first plurality of rates at which the first stroke is displayed correspond to a second plurality of rates at which the first stroke was created;
         receiving from the second user input that is associated with the first stroke;
         generating a second stroke associated with another version of the digital drawing for display based on the input received from the second user;

comparing the first stroke to the second stroke to generate a ratio that reflects a degree of similarity between the first stroke and the second stroke;

interpolating between the first stroke and the second stroke, based on the ratio, to generate a modified second stroke;

in response to a further input from the second user, generating a hybrid digital drawing by combining the second stroke with a portion of the digital drawing that was previously created by the first user, wherein the further input from the second user comprises a time threshold for completing the another version of the digital drawing; and determining the portion of the digital drawing used to generate the hybrid digital drawing based on the time threshold.

34. A computer-implemented method for reproducing authored content in a visual manipulation software environment, the method comprising:

causing a first stroke associated with a digital drawing that was previously created by a first user to be displayed to a second user at a first plurality of rates, wherein the first plurality of rates at which the first stroke is displayed correspond to a second plurality of rates at which the first stroke was created;

receiving from the second user input that is associated with the first stroke;

generating a second stroke associated with another version of the digital drawing for display based on the input received from the second user;

comparing the first stroke to the second stroke to generate a ratio that reflects a degree of similarity between the first stroke and the second stroke, wherein comparing the first stroke to the second stroke comprises recording the distances between consecutive vertices relative to the entire length of the first stroke, and resampling the second stroke to obtain the same number of vertices and the same relative distance between consecutive vertices as the first stroke; and interpolating between the first stroke and the second stroke, based on the ratio, to generate a modified second stroke, wherein interpolating between the first stroke and the second stroke comprises performing one or more linear interpolation operations between each pair of corresponding vertices of the first stroke and second stroke.

35. A non-transitory computer-readable medium including instructions that, when executed by a processing unit, cause the processing unit to reproduce authored content in a visual manipulation software environment, by performing the steps of:

causing a first stroke associated with a digital drawing that was previously created by a first user to be displayed to a second user at a first plurality of rates, wherein the first plurality of rates at which the first stroke is displayed correspond to a second plurality of rates at which the first stroke was created;

receiving from the second user input that is associated with the first stroke;

generating a second stroke associated with another version of the digital drawing for display based on the input received from the second user;

comparing the first stroke to the second stroke to generate a ratio that reflects a degree of similarity between the first stroke and the second stroke, wherein comparing the first stroke to the second stroke comprises recording the distances between consecutive vertices relative to the entire length of the first stroke, and resampling the second stroke to obtain the same number of vertices and the same relative distance between consecutive vertices as the first stroke; and interpolating between the first stroke and the second stroke, based on the ratio, to generate a modified second stroke, wherein interpolating between the first stroke and the second stroke comprises performing one or more linear interpolation operations between each pair of corresponding vertices of the first stroke and second stroke.

36. A system for reproducing authored content in a visual manipulation software environment, comprising:

a display device; and a computing device coupled to the display device and including:

a memory storing a software application, and a processor that, upon execution of the software application, performs the steps of:

causing a first stroke associated with a digital drawing that was previously created by a first user to be displayed to a second user at a first plurality of rates, wherein the first plurality of rates at which the first stroke is displayed correspond to a second plurality of rates at which the first stroke was created;

receiving from the second user input that is associated with the first stroke;

generating a second stroke associated with another version of the digital drawing for display based on the input received from the second user;

comparing the first stroke to the second stroke to generate a ratio that reflects a degree of similarity between the first stroke and the second stroke, wherein comparing the first stroke to the second stroke comprises recording the distances between consecutive vertices relative to the entire length of the first stroke, and resampling the second stroke to obtain the same number of vertices and the same relative distance between consecutive vertices as the first stroke; and interpolating between the first stroke and the second stroke, based on the ratio, to generate a modified second stroke, wherein interpolating between the first stroke and the second stroke comprises performing one or more linear interpolation operations between each pair of corresponding vertices of the first stroke and second stroke.

* * * * *